Sept. 13, 1927.

E. H. LORENZ 1,642,421

WARE TRANSFERRING MECHANISM

Filed April 29, 1924  12 Sheets-Sheet 5

Witness:
S. S. Grotta

Inventor:
Edward H Lorenz
by W. H. Howiss
Atty.

Sept. 13, 1927.

E. H. LORENZ 1,642,421

WARE TRANSFERRING MECHANISM

Filed April 29, 1924  12 Sheets-Sheet 6

Witness:
S. S. Grotta

Inventor:
Edward H. Lorenz
by W. H. Honiss.
Atty.

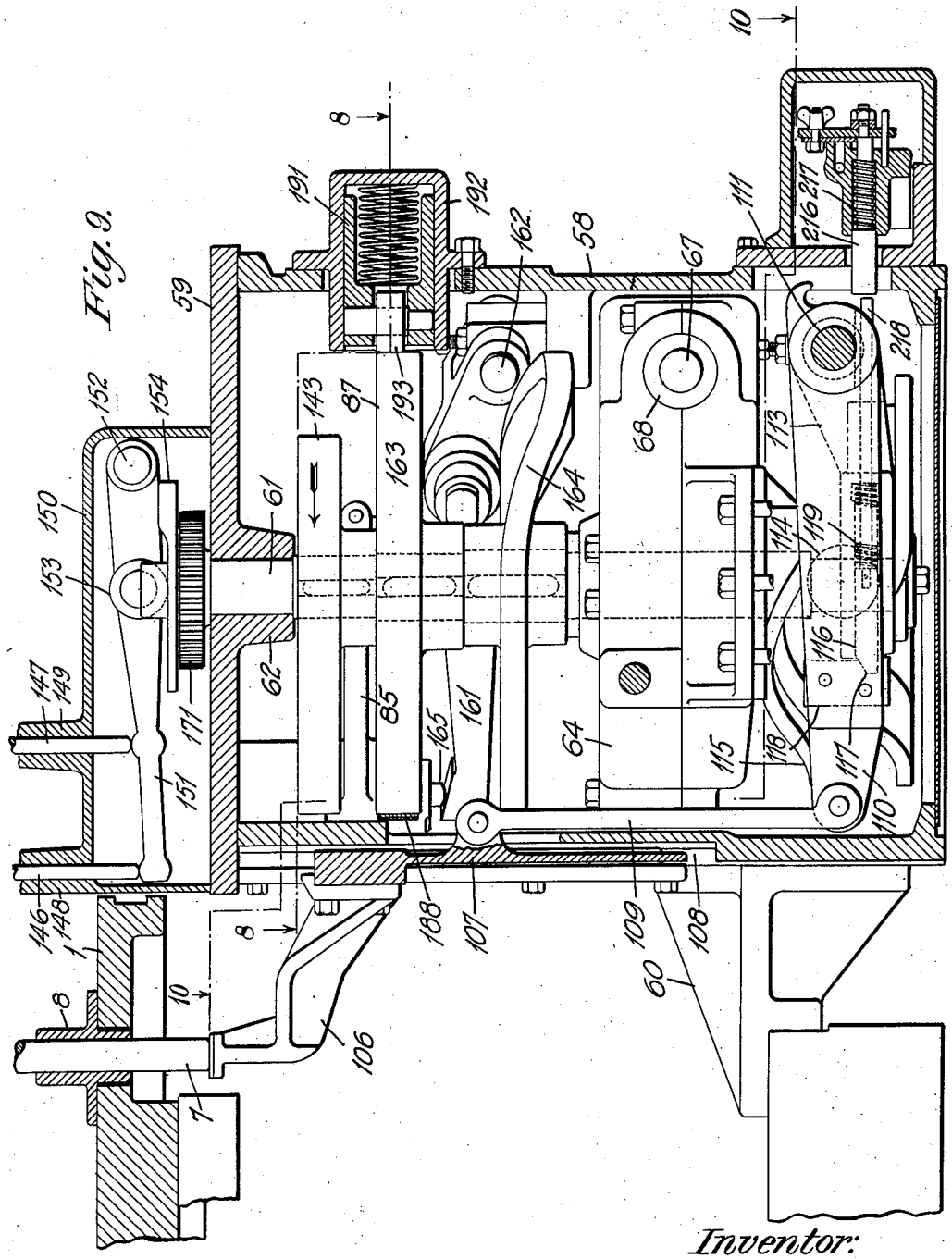

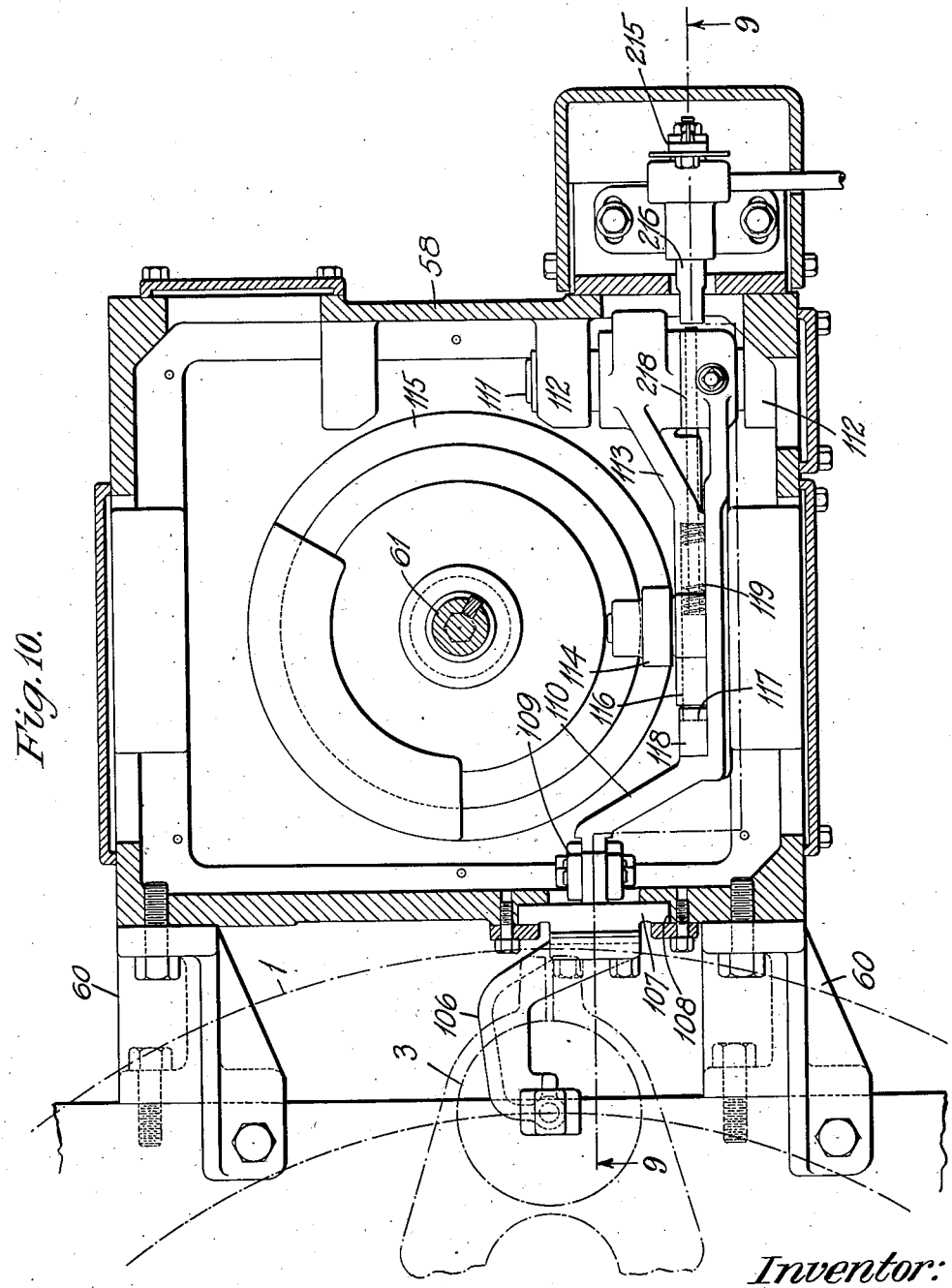

Sept. 13, 1927.

E. H. LORENZ

WARE TRANSFERRING MECHANISM

Filed April 29, 1924

Witness:
S. S. Grotta

Inventor:
Edward H. Lorenz
by W. H. Howss.
Atty.

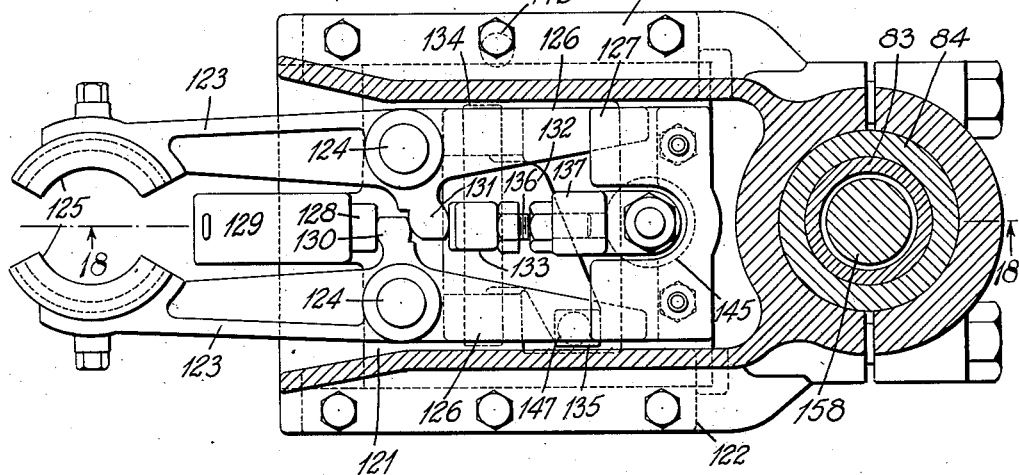

Sept. 13, 1927.
E. H. LORENZ
WARE TRANSFERRING MECHANISM
Filed April 29, 1924    12 Sheets-Sheet 11
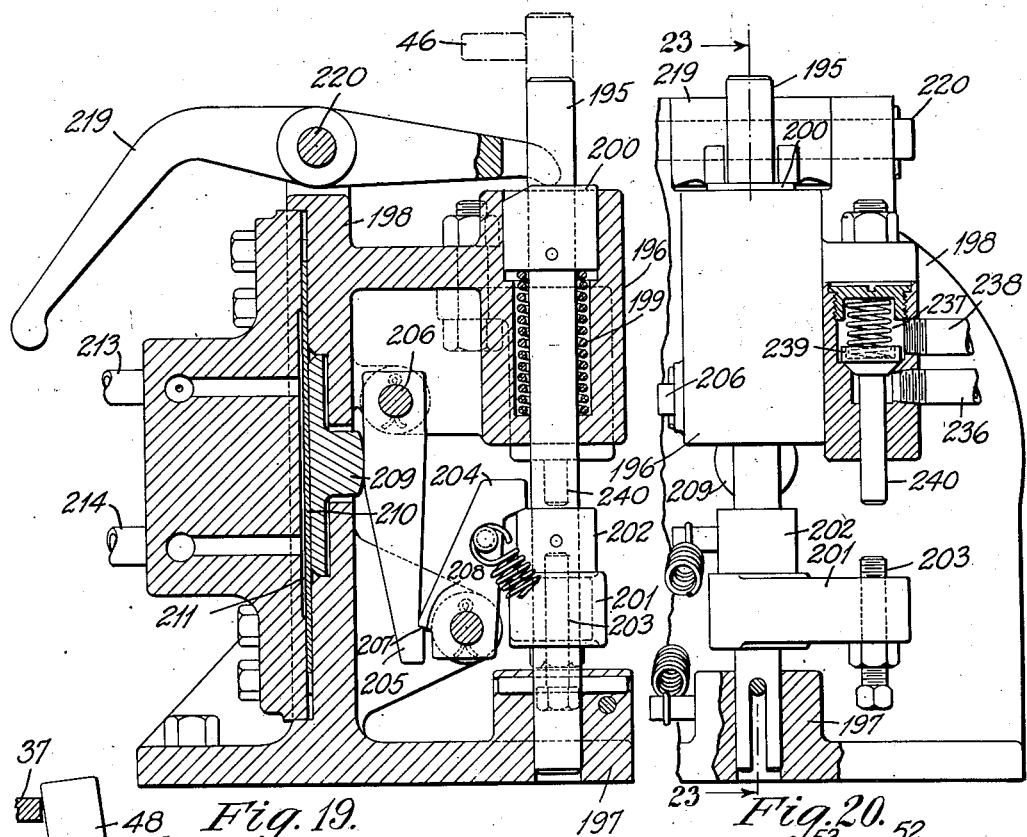
Fig.23.    Fig.22.
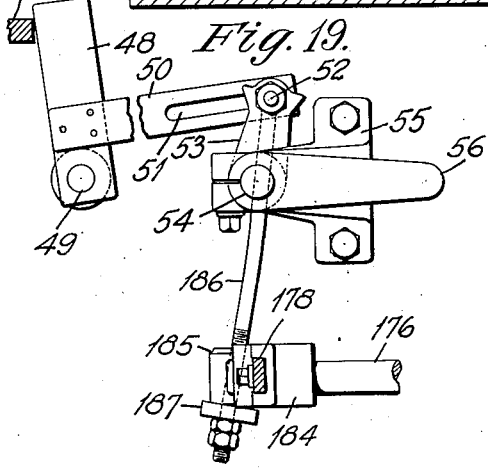
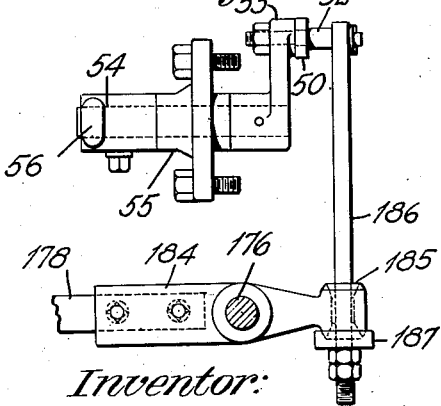
Fig. 19.    Fig.20.
Witness:
S. S. Grotta
Inventor:
Edward H Lorenz
by W H Houiss
Atty.

Sept. 13, 1927.   1,642,421
E. H. LORENZ
WARE TRANSFERRING MECHANISM
Filed April 29, 1924    12 Sheets-Sheet 12
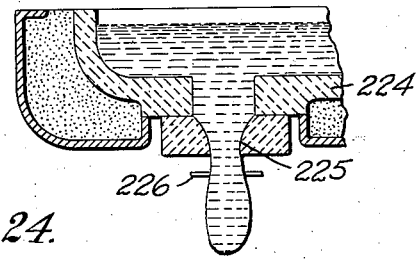
Fig. 24.
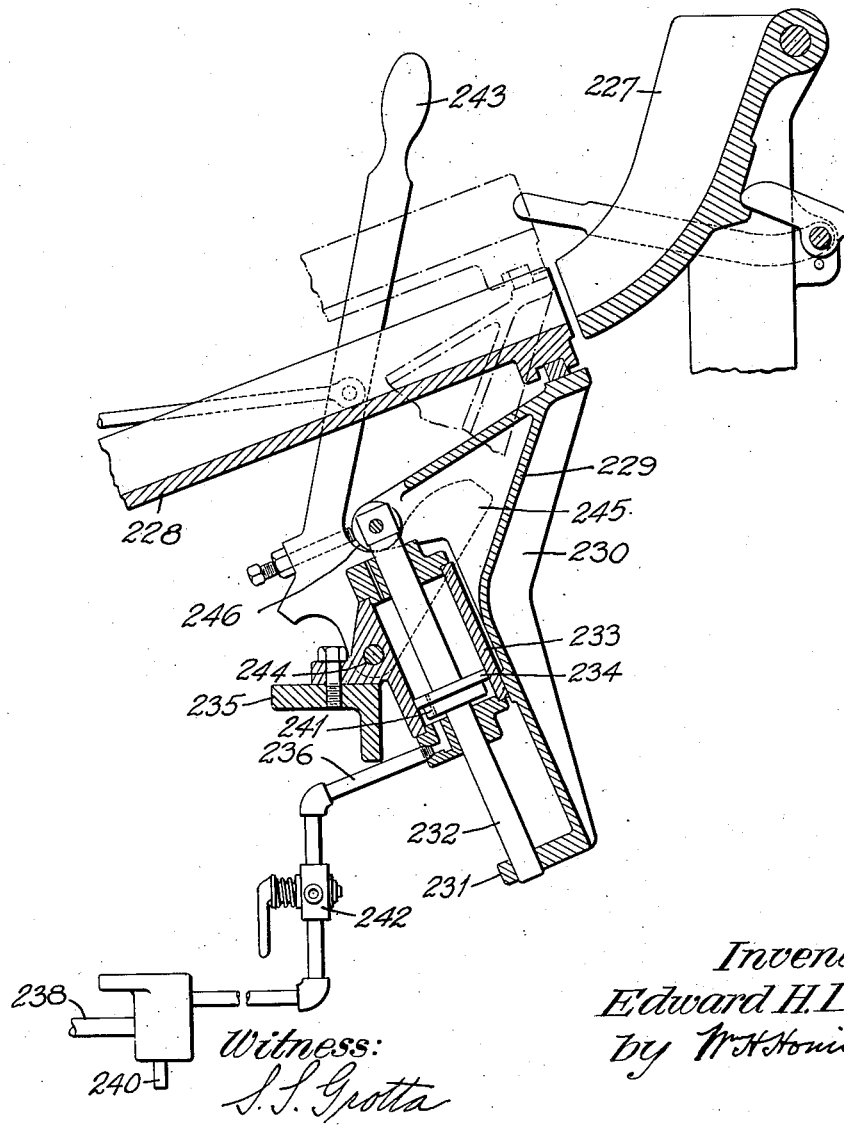
Inventor:
Edward H. Lorenz.
by *M H Houiss*
Atty.
Witness:
*S. S. Grotta*

Patented Sept. 13, 1927.

1,642,421

UNITED STATES PATENT OFFICE.

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE.

WARE-TRANSFERRING MECHANISM.

Application filed April 29, 1924. Serial No. 709,908.

The invention relates to glass shaping machines and particularly to ware transferring mechanism therefor.

One of the objects of the invention is to provide a ware transferring mechanism of a unitary character embodying efficient means for opening the molds of a shaping machine, raising the ware therefrom and into engagement with a transferring device, steadying the wire during such raising period and delivering the same to a conveyor mechanism.

Another object of the invention is to provide a mechanism, of the class designated, which embodies a pair of take-out tongs which are adapted to swing between the transfer and delivery stations of a shaping machine and which are simultaneously moved in a radial direction, with respect to the axis of swinging movement, whereby the path of travel of the ware between these stations is controlled in order that the ware may have sufficient clearance when laterally withdrawn from between the mold sections.

Another object of the invention is to provide a mechanism, of the character described, which is adapted to be driven by a ware shaping machine and which embodies suitable safety devices by means of which both the operation of the shaping machine and that of the transferring mechanism and also that of the feeding mechanism will be automatically and simultaneously discontinued in the event of abnormal operating conditions.

Further objects of the invention include such novel features of construction as will appear from the accompanying specification and drawings of a specific embodiment of the invention.

Figure 1 of the drawings is a diagrammatic plan view of the apparatus and showing the driving mechanism of the shaping machine and the connections with the ware transferring mechanism;

Fig. 7 is a developed sectional elevational view of the transferring mechanism, certain elements being shown in the same plane for the purpose of illustration;

Fig. 9 is a sectional elevation of the transferring mechanism taken on line 9—9 of Fig. 10 and showing the ware lifting elements;

Fig. 10 is a sectional plan view of the device taken on line 10—10 of Fig. 9;

Figure 1:
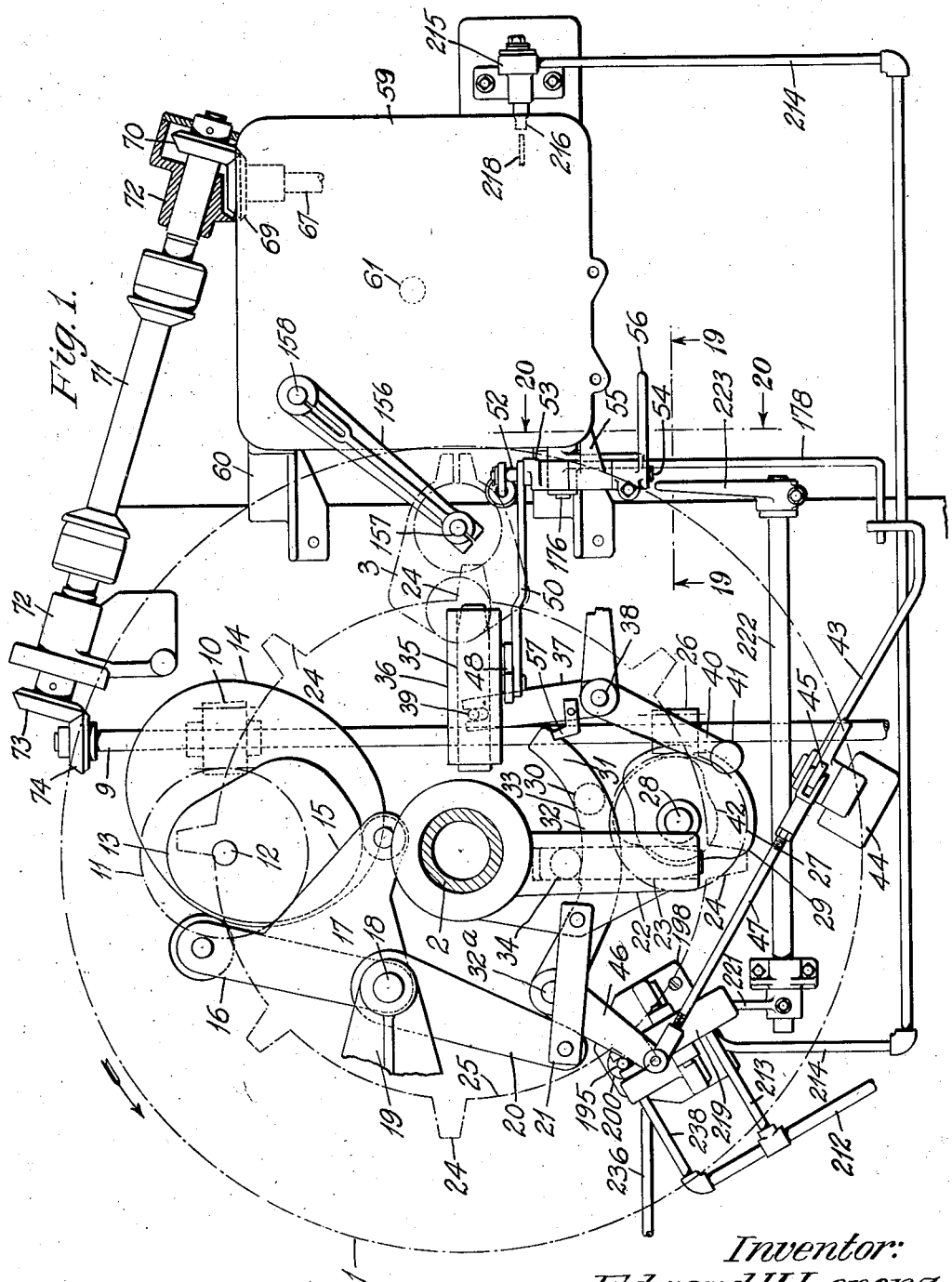
Figure 21:
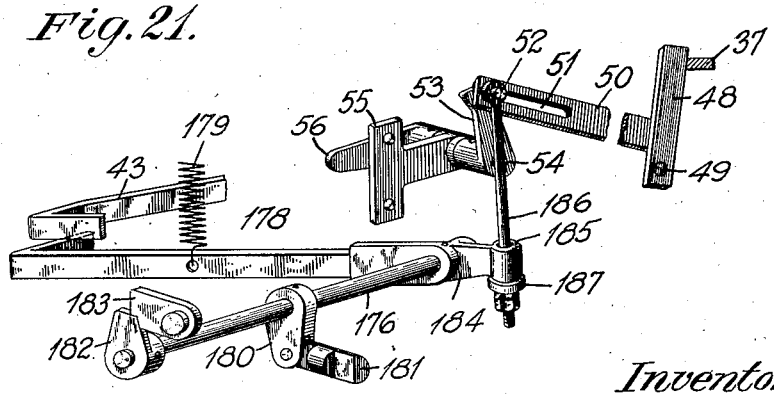

Figs. 12 to 16 inclusive are diagrammatic views illustrating the various stages of the operation of transferring the ware from a mold to the take-out tongs;

Fig. 17 is a sectional plan view on a larger scale of the take-out tongs taken on line 17—17 of Fig. 18;

Fig. 18 is a sectional elevation of the take-out tongs taken on line 18—18 of Fig. 17;

Fig. 19 is an enlarged detail elevation of the mechanism for operating the lock bolt of the shaping machine, as viewed in the direction indicated by the line 19—19 of Fig. 1;

Fig. 20 is an elevation of the structure shown in Fig. 19 as viewed in the direction indicated by the line 20—20 of Fig. 1;

Fig. 21 is a diagrammatic perspective view of the structure illustrated in Figs. 19 and 20 and showing its relation to the elements controlling the operation of the shaping machine and those of transferring mechanism;

Fig. 22 is an enlarged fragmentary elevational view of the air valve for controlling the operation of the shaping machine;

Fig. 23 is a sectional elevation taken on line 23—23 of Fig. 22;

Fig. 24 is a sectional elevation of a portion of the feeder and the mechanism for automatically stopping the delivery of glass when the operation of the shaping machine is discontinued.

The ware transferring mechanism shown herein is of the class sometimes called a "take-out", being specially adapted for taking the finished ware out of the molds of a glass shaping machine. It is herein shown associated with a glass shaping machine, which is constructed and operated substantially like that disclosed in Patent No. 1,316,550 and is designed to be operatively connected with certain of the driving and controlling elements of that machine in order to function in synchronism therewith.

The machine of the patent referred to is a duplex machine having mold tables disposed in right and left-hand relation to each other and adapted to receive in alternation mold charges delivered from a single glass feeding device. In the patent referred to, the right-hand machine of such a pair of associated shaping machines was selected for specific illustration and description, but in the present instance, a take-out mechanism of the present invention is shown as being adapted to the left-hand machine of such an organization. It will be understood, however, that a right-hand take-out mechanism embodying the present invention may be utilized in connection with a right-hand shaping machine by the reversal of its parts.

Figure 2:
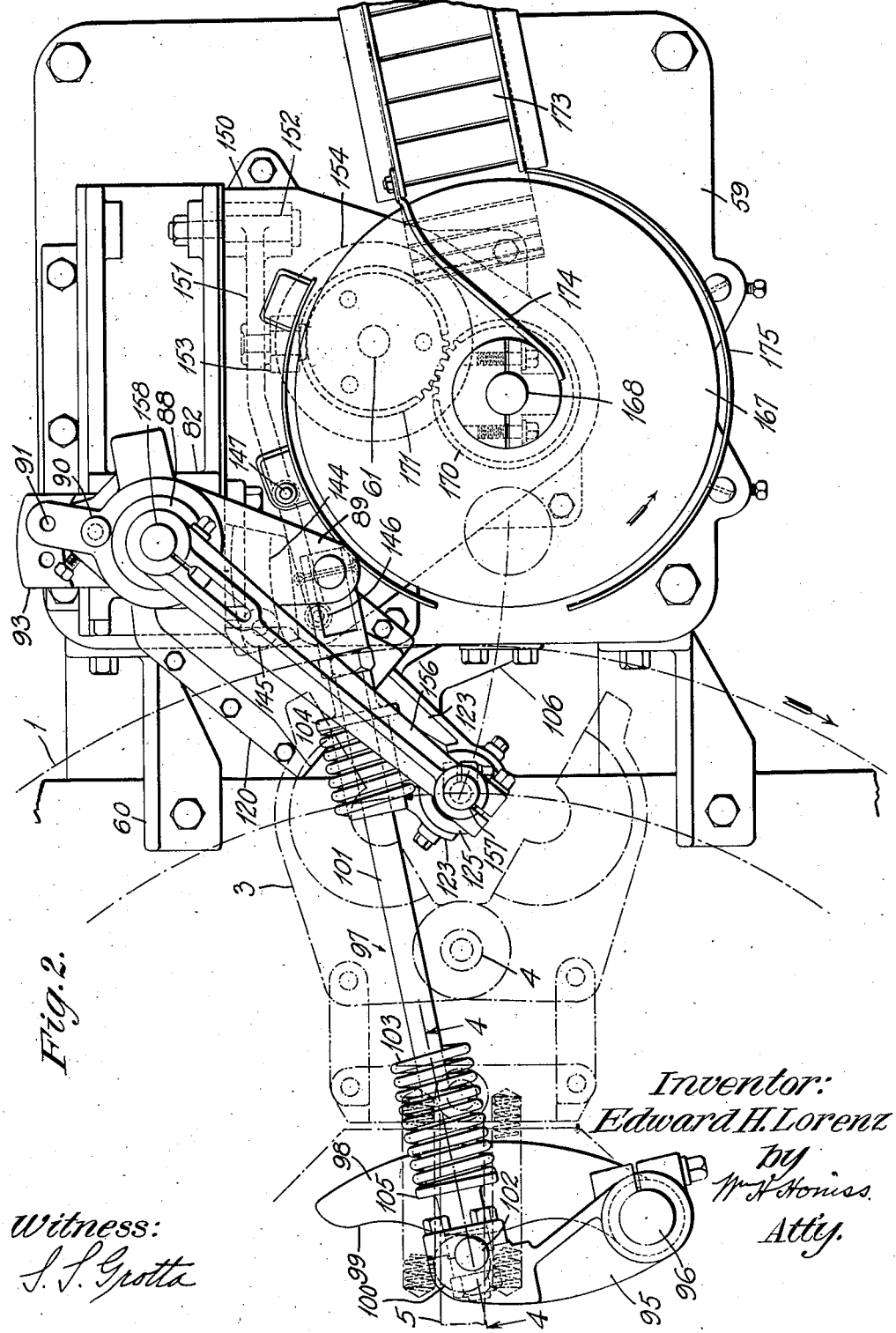
Fig. 2 is a plan view, on a larger scale, of a portion of the ware transferring mechanism.
Figure 11:
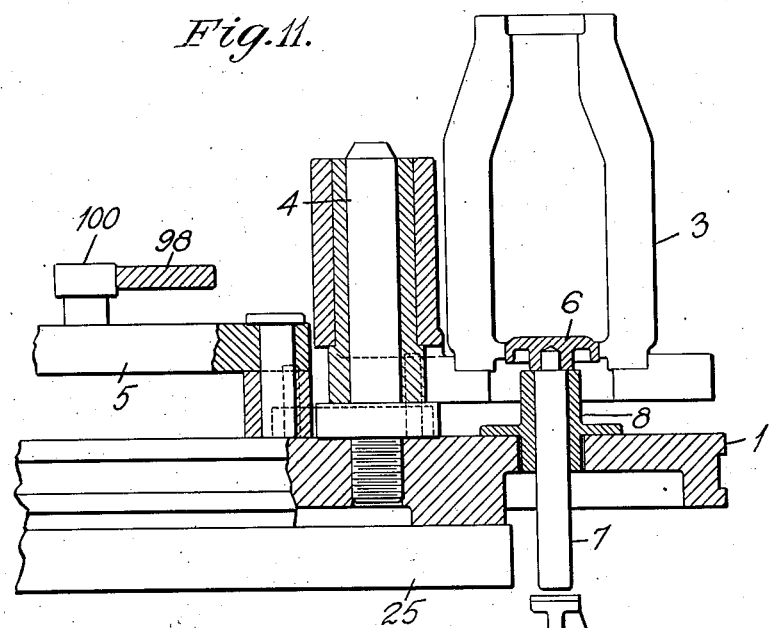
Fig. 11 is a fragmentary sectional elevation of a mold and cooperating bottom plate.
Figures 12, 13:
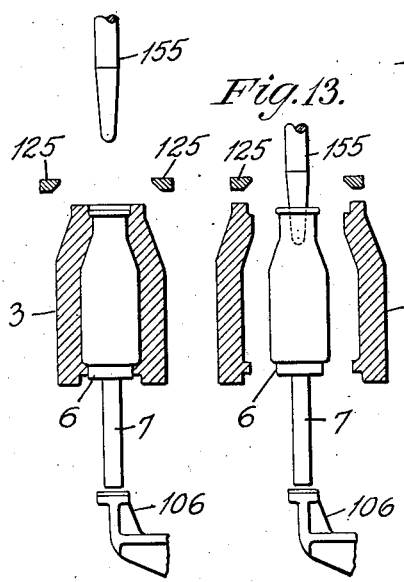
Figure 14:
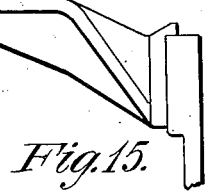
Figure 15:
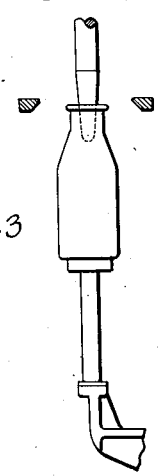
Figure 16:
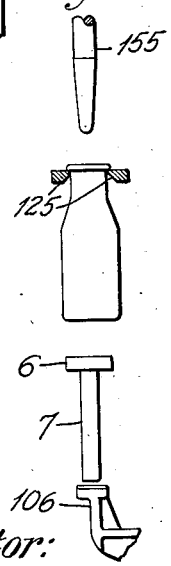

This left-hand machine has a mold table 1, shown by dotted lines in Fig. 1, mounted for intermittent rotation on a vertical spindle 2, and carries a plurality of divided molds, the halves 3 of which are hinged upon pins 4 secured to the table 1. (Figs. 2 and 11). Each mold is opened and closed by a slide 5, which is connected to the mold halves by a suitable link connection, the actuating mechanism of which will be presently described. Each mold is provided with a bottom plate 6, carried by a vertical stem 7 which extends through the table and is slidably mounted in a suitable bearing 8.

The mold table is rotated by shaft 9 (Fig. 1) provided with a worm 10 which meshes with a worm gear 11 fixed to a shaft 12. The shaft 12 is provided with cams 13 and 14 which respectively actuate arms 15 and 16 of a bell crank lever 17 which is pivotally mounted on a shaft 18. The shaft 18 is carried by a bracket 19 secured to a stationary portion of the shaping machine, not shown. The cams 13 and 14 thus effect a positive partial rotation of the table and prevent it from being carried past its stations by its momentum. A lever 20 is fixed to the lever 17 and is connected by means of a link 21 to a table rotator arm 22 which is pivoted upon the spindle 2, and carries a spring pressed rotator bolt 23 which periodically engages successive notches 24 in a ring 25 on the under-side of the table 1, and intermittently advances the table and the molds carried thereby. The ring 25 is provided with eight such notches, the table being adapted for eight molds.

The rotator bolt 23 is moved radially in the arm 22 to successively engage and disengage the notches 24 by means of the following described mechanism: On the drive shaft 9 is a worm 26 which drives a worm gear 27 fixed to a vertical shaft 28. A cam 29 fixed to the upper end of the shaft 28 acts against a roller 30 carried by an arm 31 of a bell crank lever 32 which is pivotally mounted at 32$^a$ upon a fixed portion of the machine, not shown. The arm 31 has an arcuate track 33 engaging a roller 34 on the rotator bolt 23. During the time that the rotator bolt 23 is in engagement with one of the notches 24, while advancing the table, the cam 29 permits the arm 31 to be held outwardly under the action of the spring pressed rotator bolt 23 and the roller carried thereby. When the arm 22 and the bolt 23 reach the end of their active stroke, the cam 29 bears against the roller 30, swinging the arm 31 of the lever 32 inwardly. The arm 31 engages the roller 34 and forces the rotator bolt 23 radially inwards and out of the notch 24 with which it is, at such time, in engagement (Fig. 1). When the arm 31 is in this position the arcuate track 33 is concentric with the path of travel of the roller 34 and maintains the rotator bolt 23 in a retracted position during its return movement, which ceases when the rotator bolt 23 is in alignment with the next succeeding notch 24. At this stage the cam 29 releases the arm 31 which in turn releases the rotator bolt and permits it to move radially into engagement with the notch for the next advancement of the table.

To prevent the table from rotating while the rotator bolt is disengaged from the ring 25, a suitable locking mechanism is provided, consisting of a spring pressed lock bolt 35 mounted in a guide 36 carried by a stationary portion of the machine, not shown. This bolt is so located that a notch 24 of the table is brought into alignment therewith when the table completes each forward movement, at which position the lock bolt 35 is pressed by its spring into the notch 24 and locks the table during the return stroke of the rotator arm 22. The lock bolt 35 is withdrawn from the notch 24 by means of a lever 37 on a fixed stud 38 and has a slotted end engaging with a pin 39 on the lock bolt. An arm 40 is fixed to the lever 37 and is provided with a cam roll 41 for engagement with a cam 42 which is fixed to the vertical shaft 28. The lock bolt cam 42 and the rotator cam 29 are so set that when the latter withdraws the rotator bolt 23 from a notch 24, at the end of its forward stroke, the cam 42 will allow the lock bolt 35 to enter a succeeding notch 24 under the action of its spring. Conversely, when the cam 29 releases the rotator bolt 23 at the commencement of its forward or driving stroke, the cam 42 will, through the levers 40 and 37, withdraw the lock bolt 35 from its notch 24, thus releasing the table for its forward movement.

The rotator bolt 23 may be manually withdrawn from the table and held out by means of a treadle 43, pivotally mounted in a bracket 44 on the base of the machine, and provided with an upwardly extending arm 45 which is pivotally connected to an arm 46 of the lever 32 by means of a link 47. By reason of this connection, the treadle 43 oscillates continuously during the normal operation of the machine but if it is desired at any time to stop the shaping machine, it is only necessary to maintain the treadle in a depressed position in order to hold the bolt 23 out of engagement with the table.

It is sometimes desirable to rotate the table of the shaping machine by hand during an inoperative period, in order to change the molds or to make other adjustments, and to release the table for such movement, the lock bolt 35 may be retracted and held in a retracted position, by means of a lever 48 (Figs. 1, 19, 20 and 21) which is pivoted, as at 49, to a fixed portion of the machine, not shown, and which is adapted to bear against the lock bolt lever 37. The lever 48 is provided with an arm 50 having a slot 51 formed therein which is engaged by a crank pin 52 carried by an arm 53 fixed to a shaft 54 (Fig. 1). The shaft 54 is journaled in a bearing 55 carried by the casing of the ware transferring mechanism, presently to be described, and is provided with an operating handle 56. When it is desired to withdraw or hold out the lock bolt 35, the handle 56 is moved through an arc of 180°, thereby swinging the arm 53 in an upward direction and causing the lever 48 to force the arm 37 about its pivot 38 and withdraw the lock bolt 35 (Figs. 1, 19, 20 and 21). The lock bolt 35 is retained in this retracted position while the crank arm 53 occupies the position past its dead center relative to the action of the arm 50 (Figs. 19 and 21).

The rotator bolt 23 is also locked out of action during such time as the lock bolt 35 is withdrawn, through the medium of a pawl 57 (Fig. 1) which is carried by the lever 37 and is adapted to engage behind the arm 31 of the bell crank lever 32. The rotation of the mold table of the shaping machine may thus be discontinued independently of the treadle 43, for the reason that if the lever 37 is moved to retract the lock bolt 35, the pawl 57 will be carried into the path of movement of the end of the arm 31 of the lever 32, and will fall behind that arm upon the first inward movement of the arm 31.

As thus far described, the construction of the machine is substantially that disclosed in Patent 1,316,550 above referred to.

Figure 5:
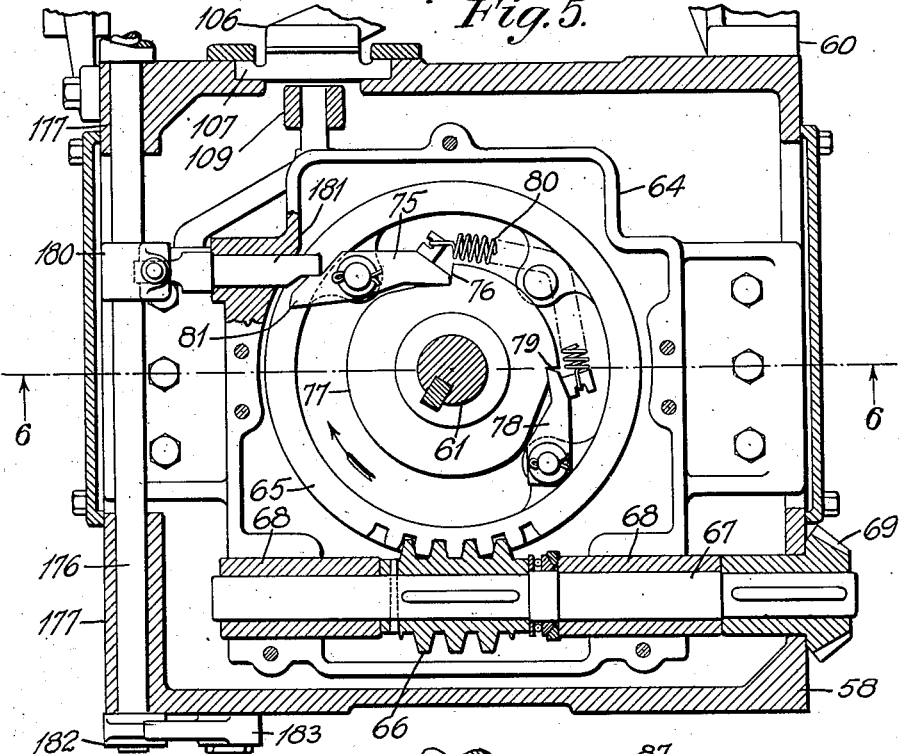
Fig. 5 is a sectional plan view of the driving elements of the transferring mechanism, taken on line 5—5 of Fig. 6.
Figure 6:
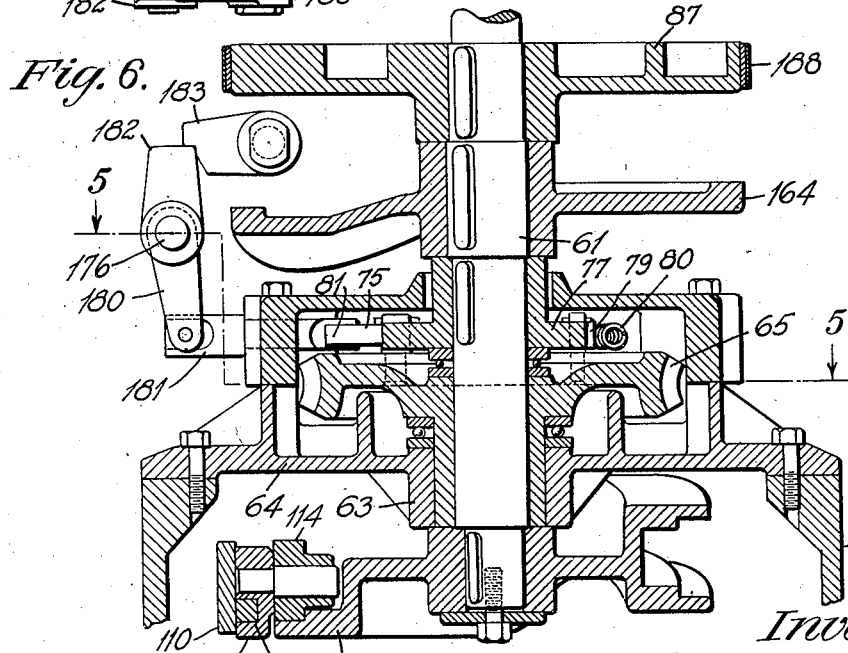
Fig. 6 is a sectional elevation of the driving mechanism, taken on line 6—6 of Fig. 5.

The ware transferring mechanism of the present invention is carried by a casing 58 which is provided with a cover 59 and which incloses the driving elements of the device. This casing is at one side of the shaping machine and its position is fixed with respect thereto by means of brackets 60 which are fixed to the side wall of the casing and to the base of the machine (Figs. 9 and 10). A vertically extending cam shaft 61 is disposed within the casing 58 and mounted in bearings 62 and 63, which are respectively carried by the cover 59 and a housing 64 (Figs. 6, 7 and 9). A worm gear 65 is rotatably mounted on the shaft 61 within the housing 64 and is driven by a worm 66 fixed to a horizontally extending drive shaft 67 (Figs. 5 and 6). This shaft is journaled in bearings 68 on the housing 64 and projects through the side wall of the casing 58 and its outer end is provided with a bevel gear 69 which is driven by a bevel gear 70 fixed to one end of a transmission shaft 71 (Fig. 1), which is mounted in bearings 72 and is provided at its other end with a bevel gear 73 driven by a bevel gear 74 fixed to the main drive shaft 9 of the shaping machine.

A driving connection is effected between the worm gear 65 and the shaft 61 by means of a pawl 75 (Fig. 5) carried by the worm gear 65 and adapted to engage a shoulder 76 formed in the periphery of a disk 77 fixed to the shaft 61. In addition to the pawl 75, the worm gear 65 is provided with a hold-back pawl 78 which engages a shoulder 79 formed on the disk 77 and prevents the shaft 61 and the cams carried thereby from running ahead of the worm gear during the operation of the machine. The pawls 75 and 78 are normally held in yieldable engagement with the periphery of the disk 77 by means of a suitable connecting spring 80. The pawl 75 is provided with a rearwardly extending finger portion 81, the function of which will be presently set forth.

The instrumentalities which open the molds, remove the ware therefrom and steady it during its removal, are mounted on the top of the casing 58 in the following manner:

A tubular column 82 is mounted on the cover 59 of the casing 58 and constitutes a support for inner and outer concentric rock sleeves 83 and 84 respectively, which extend through the column and into the upper portion of the casing 58 (Fig. 7). The sleeve 83 is rocked within the outer sleeve 84 by means of an arm 85 which is fixed to its lower end and which is provided with a roller 86 for engagement with a cam 87 fixed to the shaft 61. A hub member 88 is fixed to the upper end of the sleeve 83 and provides a bearing for an arm 89. This arm is fixed to the hub 88 by means of a removable pin 90 during the normal operation of the machine.

Figure 4:
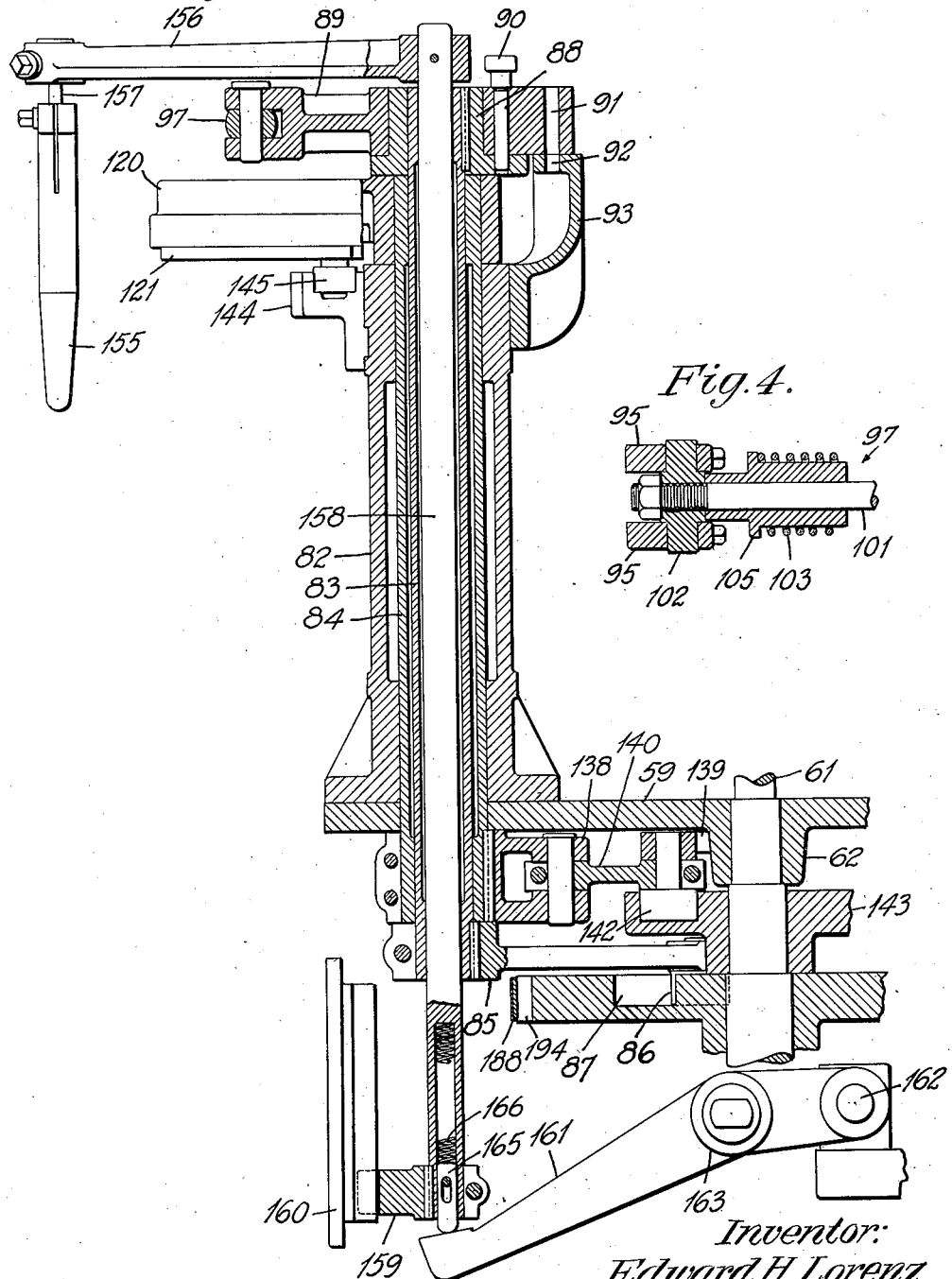
Fig. 4 is a sectional elevation of one end of the yieldable connection taken on line 4—4 of Fig. 2.

The arm 89 is pivotally connected to an arm 95 which is fixed to a rock shaft 96 by means of a yieldable connection 97 (Figs. 2 and 4). The shaft 96 is journaled in bearings which are carried by stationary portion of the shaping machine. A mold opening lever 98, provided with a cam surface 99, is fixed to the lower end of the shaft 96 and is adapted to be intermittently moved across the path of travel of a roller 100 which is carried by the mold opening rod 5. The action of the lever 98 is so timed that when a mold comes to rest at the transfer station, the lever 98 swings about its pivot and into engagement with the roller 100, thereby forcing the mold actuating rod 5 radially inwards to open the mold.

Figure 3:
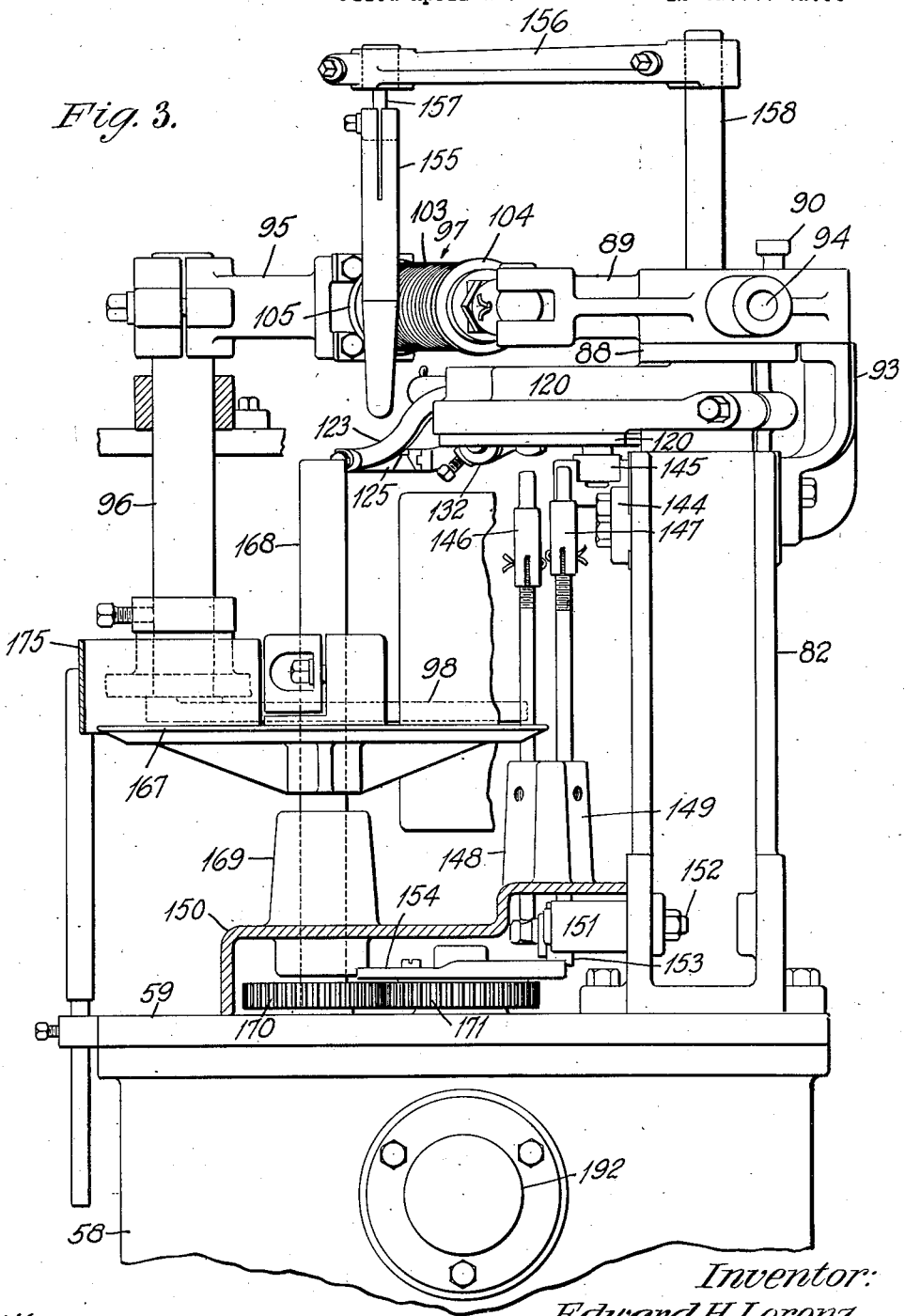
Fig. 3 is a side elevational view of the upper portion of the ware transferring mechanism.

If for any reason it should become necessary to remove ware from the mold by hand, such as through a failure of the take-out mechanism to function, the molds may be opened by the rotation of the mold table by locking the lever 98 in a fixed position with the cam surface 99 thereof in the path of the rollers 100. When the lever 98 occupies such a position, the rollers 100 will successively engage the cam surface 99 and be forced radially inwards to open the molds at the transfer station without depending upon the oscillation of the lever 98 for this purpose. This is accomplished by transferring the pin 90 to apertures 91 and 92 which are respectively provided in the arm 89 and in a bracket 93 carried by the column 82 (Fig. 7). By so doing, the arm 89 is disconnected from the hub 88 and is locked to the bracket 93 in the position shown in Fig. 2. For convenience the arm 89 may be moved manually in order to align the apertures 89 and 90 by the use of a lever consisting of a bar or pipe inserted in a socket 94, which is provided for that purpose on the side of the arm (Figs. 2 and 3).

The yieldable connection 97 preferably comprises a rod 101, one end of which is pivotally connected to the arm 89. The other end of the rod 101 is slidably disposed in a block 102 which is pivotally connected to the arm 95. A coiled spring 103 surrounds the rod 101 and is disposed between collars 104 and 105 which are carried by the rod 101. This construction provides a connection of sufficient rigidity to meet with normal operating conditions, but in the event that an abnormal strain is encountered, such as may be occasioned by a mold refusing to open, the movement of the lever 98 will cease when it engages the roller 100 of such mold and the rod 101 will slide through the block 102 against the pressure of the spring 103. Conversely, if the lever 98 is locked in the path of the rollers 100, by means of the pin 90, as has been heretofore described in connection with the removal of the ware from the molds by hand, it will be forced about its pivot when a roller engages the cam surface 99, thus causing the block 102 to slide along the rod 101.

The operation of taking out the ware is shown diagrammatically in Figs. 12 to 16. When, as here shown, the top of the bottle does not project above the top of the mold, the bottle is pushed up from below by means of an arm 106 which is adapted to engage the lower end of the stem 7 of the mold bottom plate 6 and to raise the same (Fig. 9).

The arm is carried by a slide 107 which is mounted in ways 108 provided on a side wall of the casing 58. The slide 107 is reciprocated in its ways by means of a link 109, the lower end of which is pivotally connected to one end of a lever 110 which is fixed to a rock shaft 111 journaled in bearings 112 carried by the casing 58. A lever 113 is mounted for rocking movement on the shaft 111 and is provided with a roller 114 for engagement with a cam 115 fixed to the shaft 61. The levers 110 and 113 are yieldably connected to move in unison during the normal operation of the machine, by means of a detent 116 which is slidably mounted on the lever 113 for engagement with a notch 117 formed in a block 118 carried by the lever 110. The detent 116 is maintained in engagement with the notch 117 by a spring 119 which exerts sufficient pressure to maintain an operative connection between these parts under normal operating conditions but which may be compressed sufficiently to permit the detent to be forced out of its notch to render the lever 110 inoperative in the event that an abnormal strain is encountered. When the levers 110 and 113 are thus disconnected the lever 113 will oscillate upon the shaft 11 without transmitting any motion to the lever 110 and to the parts actuated thereby.

The mechanism for removing the ware from a mold subsequent to its elevation therefrom by the bottom plate 6, includes a transfer arm 120 which is adjustably secured to the upper end of the outer rock sleeve 84 (Fig. 7). This arm is recessed on its under side to provide a housing for a carriage or slide 121 which is supported therein by gibs 122 (Figs. 17 and 18). A pair of cooperating take-out or transfer tongs 123 are pivotally mounted on the slide 121 for horizontal swinging movement, as at 124, and are provided at their outer ends with coacting ware engaging jaw members 125 having a radius of curvature corresponding approximately to that of the ware to be transferred, and which are made interchangeable to provide for ware of different diameters. The tongs 123 are also provided with inwardly extending arms 126 which project beneath a plate 127 carried by the slide 121, thereby preventing undue strain upon the pivots 124. The tongs 123 are closed by means of a spring actuated plunger 128 which is slidably mounted in a tubular guide 129 carried by the slide 121 and bears against a lug 130 provided on one member of the tongs. The lug 130 engages a similar lug 131 provided on the opposite member of the tongs and which extends in an opposite direction and in overlapping contiguous relation with respect to the lug 130. The tongs are opened against the action of the plunger 128 by means of a bell crank lever 132, one arm 133 of which extends upwardly into engagement with the lug 131 and which is mounted on a shaft 134 carried by the slide 121. The other arm 135 of the lever 132 extends rearwardly and is actuated by means hereinafter described. The distance between the jaws 125 when in a closed position is regulated by an adjusting screw 136 which is threaded into a lug 137 provided on the slide and which is engaged by the arm 133 of the lever 132 when the tongs are closed by the plunger 128.

The tongs are oscillated to and from a position adjacent to the transfer station by means of an arm 138 (Figs. 7 and 8) which is fixed to the lower end of the outer rock sleeve 84. This arm is, in turn, oscillated by an arm 139 to which it is connected by a link 140. The arm 139 is pivotally mounted on the casing 58 at 141 and is provided with a roller 142 for engagement with a cam 143 fixed to the shaft 61.

The slide 121 and the tongs 123 carried thereby are reciprocated on the arm 120 by means of a cam 144 (Figs. 2 and 18) fixed to the column 82 and engaged by a roller 145 mounted on the under side of the slide 121. When the arm 120 is swung toward the transfer station the cam 144 forces the roller 145 and the slide 121 radially outwards and projects the tongs to a position in which the jaws 125 are directly over the ware. Conversely, when the tongs are swung away from the transfer station to a delivery station, the cam 144, acting on the roller 145, simultaneously retracts the slide 121 to the position shown in Figs. 17 and 18. This retraction of the slide is for the purpose of providing sufficient clearance for the ware as it is removed from between the mold sections. The tongs are opened to receive and discharge the ware at the transfer and delivery stations respectively, by means of rods 146 and 147 which are slidably mounted for vertical movement in bearings 148 and 149 carried by a housing 150 which is, in turn, mounted on the cover 59 of the casing 58 (Fig. 9). The rods 146 and 147 are so positioned in the path of travel of the tongs opening lever 132 that the horizontal arm 135 thereof is disposed directly above one or the other of these rods when the tongs 123 occupy a position at either extreme of their path of movement (Figs. 17 and 18). The rods 146 and 147 are simultaneously actuated at these points by means of a lever 151 (Fig. 9), which is pivotally mounted within the housing 150, as at 152, and which constitutes a common support for these rods. The lever 151 is provided with a roller 153 which engages a disk cam 154 fixed to the upper end of the shaft 61. The movement of these rods is so timed with respect to the swing movement of the tongs 123 that when the tongs have been moved to a position above a mold, the rods 146 and 147 are raised and the rod 146 will elevate the arm 135 of the lever 132 against the action of the plunger 128 (Figs. 16 and 17) thereby opening the tongs to receive the ware. As soon, however, as the ware is elevated and properly positioned between the tongs, the rods 146 and 147 are lowered, permitting the spring actuated plunger 128 to close the tongs about the ware. When the tongs have been swung to the delivery station the arm 135 of the lever 132 occupies a position in alignment with the rod 147 which is again raised along with the rod 146 and actuates the lever 132 to discharge the ware. It will be noted in this connection that, although both of the rods 146 and 147 ascend and descend together, when the rod 146 opens the tongs to receive the ware, the rod 147 is ineffective and that when the rod 147 actuates the tongs to discharge the ware, the rod 146 is ineffective. By means of this construction the ware is removed from a mold and transferred to a delivery station in a line which is the resultant of the arcuate movement of the arm 120 and the rectilinear movement of the tongs carried thereby, and which provides sufficient clearance for the ware as it is withdrawn laterally from between the mold sections. The path of the ware from the molds to the delivery station may, however, be altered by changing the shape of the cam 144.

Figure 8:
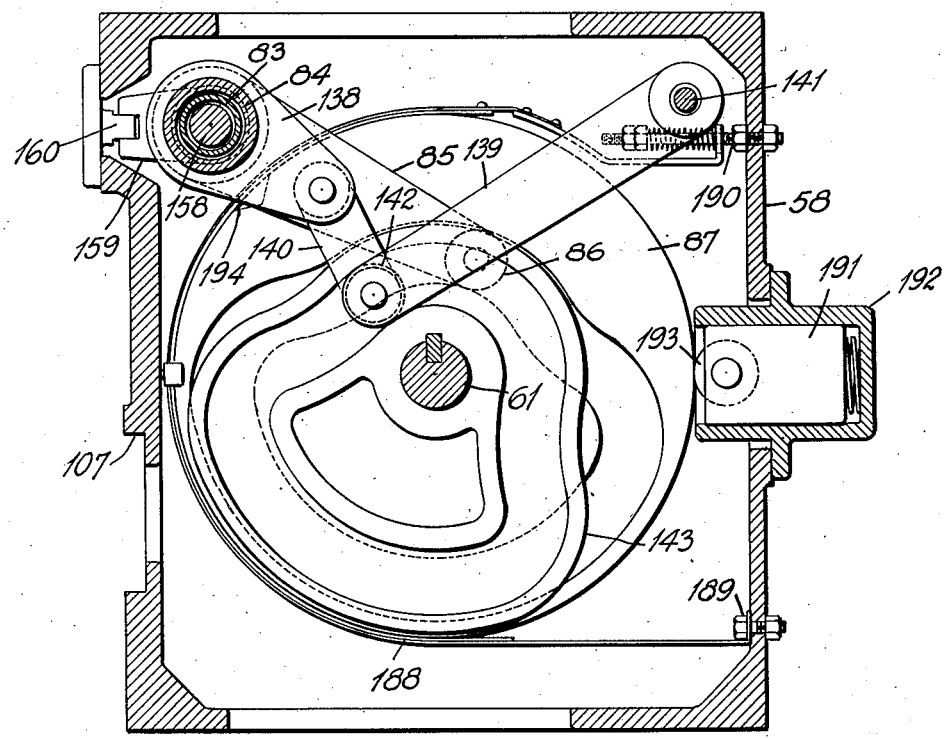
Fig. 8 is a sectional plan view of the cams which actuate the mold opening and tongs swing devices and taken on line 8—8 of Fig. 9.

To prevent the dislodgment of the ware from the bottom plate 6, by the opening of the mold or while it is being elevated from the mold, a steadying pin 155 is provided which descends into the ware before the mold opens (Figs. 3, 7 and 12 to 16), and raises therewith until it is properly positioned between the jaws 125 of the take-out tongs. This pin also provides lateral support for ware having imperfect bottom portions, such as may result from incomplete blowing, and which are therefore of themselves unable to stand in an upright position. The pin 155 is suspended from an arm 156 by means of a pin 157 (Fig. 7). The pin 157 is replaceable and is preferably made of a frangible material, such as cast iron or brass, so that if abnormal strain is brought to bear upon the steadying pin 155, the pin 157 will break without causing other damage to the machine or to the pin 155. The arm 156 is fixed to the upper end of a non-rotatable, vertically movable rod 158 which is mounted to slide within the inner rock sleeve 83, being prevented from rotating by means of an arm 159 fixed to the lower end of the rod and projects laterally into a vertical guideway 160 on a side wall of the casing 58 (Figs. 7 and 8). The rod 158 is reciprocated within the sleeve 83, to raise and lower the steadying pin 155 in timed relation to the horizontal movement of the take-out tongs 123, by means of a lever 161 pivotally mounted on the casing, at 162, and provided with a cam roller 163 for engagement with a cam 164 fixed to the shaft 61, (Fig. 9). A cushioned action between the rod 158 and the lever 161 is effected by means of a plunger 165 which is seated in a recess in the end of the rod 158 and is pressed by a spring 166 into engagement with the lever 161, (Fig. 7). This spring is designed to absorb the shock in the event that the rod 158 and the parts carried thereby should lodge or be otherwise held in a raised position and subsequently dropped upon the lever 161.

The action of the steadying pin 155 with respect to the take-out tongs 123 is as follows:

Upon the arrival of a mold at the transfer station, the steadying pin 155 descends into the ware between the jaws 125 before the mold is opened, and rises simultaneously with the ware when the latter is elevated by the bottom plate 6. As soon as the ware is engaged between the jaws 125, the bottom plate 6 descends, as has been previously described, the steadying pin 155 continuing its upward movement until it is entirely withdrawn from the ware to a position without the path of the tongs 123 (Fig. 16), at which time the tongs are caused to move horizontally and to deliver the ware to a rotating transfer disk 167 (Figs. 2 and 3).

The transfer disk 167 is fixed to a vertically extending shaft 168 which is journaled in a bearing 169 carried by the housing 150. When the tongs are moved to a position over the disk 167 and are opened to release the ware, the latter is removed laterally from between the tongs by the rotation of the disk. The disk 167 and the shaft 168 are rotated by means of a gear wheel 170 which is fixed to the lower end of the shaft 168 and is driven by a gear wheel 171 carried by the shaft 61 of the transferring mechanism (Figs. 2, 3 and 9). A suitable conveyor mechanism 173 is arranged adjacent to the disk 167, to which the ware is deflected by means of a suitably disposed guide bar 174 (Fig. 2). The ware is prevented from becoming prematurely displaced from the disk 167 by means of a coacting guard bar 175.

The operation of the transferring mechanism may be discontinued at any time, either simultaneously with that of the shaping machine or independently thereof, by means of the mechanism shown in Figs. 5, 6, 19, 20 and 21.

A rock shaft 176 extends transversely along one side of the casing 58 and is mounted in bearings 177 carried by one of the side walls thereof (Figs. 5 and 6). A treadle lever 178 is fixed to one extremity of the shaft 176 and extends to a position beneath the treadle lever 43 of the shaping machine (Figs. 1 and 21). The outer end of the lever 178 is yieldably held upwardly for engagement with the lever 43 by a spring 179 which is connected at its upper end to a fixed portion of the machine, not shown. An arm 180 is fixed to the shaft 176 and is pivotally connected to one end of a latch bar 181 which is slidably mounted in the bracket 64 for movement into and out of the path of travel of the finger portion 81 of the pawl 75 (Figs. 5, 6 and 21). An arm 182 is also fixed to the shaft 176 and is engageable by a dog 183 which is pivotally mounted on a side wall of the casing 58.

When the shaping machine is in operation, the treadle lever 43 oscillates vertically under the action of the cam 29 and the bell crank lever 32 (Fig. 1), moving the treadle 178 with it and effecting a corresponding oscillation of the rock shaft 176 and latch arm 180 and moving the latch bar 181 to reciprocate into and out of the path of travel of the finger portion 81 of the pawl 75 (Figs. 5 and 6). The pawl 75 is so positioned on the worm gear 65 with respect to the reciprocation of the latch bar 181 that under normal conditions the finger portion 81 passes the latch bar 181 when the latter is in a retracted position. If, however, the treadle bar 178 is held in a depressed position, either by the treadle lever 43 or independently thereof, as will be hereinafter explained, the latch bar 181 will be maintained in the path of the finger portion 81, thus moving the other end of the pawl 75 out of the path of the shoulder 76 of the disk 77 at this portion of each rotation of the worm gear 65 and thereby leaving the disk 77 and shaft 61 stationary. The operation of all the parts which receive power from the drive shaft 61 will consequently cease. The mechanism is so timed that when the operation thereof thus is discontinued, the various parts of the transfer elements stop in positions of safety remote from the shaping machine and out of the path of travel of the molds and their associated parts, thereby permitting the removal of ware by hand without interference by the automatic take-out elements.

If it is desired to maintain the transferring mechanism inoperative independently of the operation of the shaping machine, the treadle lever 178 is maintained in its depressed position with the latch bar 181 extending into the path of the pawl 75, by moving the dog 183 into engagement with the arm 182, as illustrated in Figs. 5 and 6.

It is desirable, however, to stop the ware transferring mechanism when the handle 56 is operated to stop the operation of the shaping machine, thereby effecting the stopping both of these machines by a single manual operation. To this end, the treadle lever 178 is provided with an arm 184 (Figs. 19, 20, 21), the extremity of which is formed with an eye portion 185. A link 186 carrying an abutment 187 at its lower end, extends loosely through the eye 185 and is pivotally connected at its upper end to the crank arm 53, which actuates the lock bolt mechanism of the shaping machine. During the normal operation of the machine, the arm 53 extends downwardly with the link 186 depending therefrom, and the abutment 187 disposed out of the path of travel of the eye portion 185 of the arm 184. When the parts occupy this position, the arm 184 is free to oscillate, under the action of the treadle lever 43 and spring 179, with the eye portion 185 sliding freely along the link 186. If, however, the lever 56 of the latch bolt mechanism is moved to the position shown in full lines in Figs. 19, 20 and 21, to push out the lock bolt 35 and discontinue the operation of the shaping machine, the arm 53 will be swung upwardly and raise the link 186. The raising of the link 186 elevates the abutment 187 against the eye 185 and maintains the arms 184 in a raised position with the latch bar 181 disposed in the path of the pawl 75, thereby discontinuing the operation of the transfer mechanism simultaneously with that of the shaping machine.

The various elements of the transferring mechanism are prevented from overrunning when they are disconnected from their source of power, by means of a brake band 188 which partially surrounds the periphery of the cam 87 (Figs. 8 and 9). One end of this band is fixed to the casing at 189 and the other end thereof is adjustably secured to the casing at 190. In order to insure that the parts will come to rest in their proper position, a spring pressed detent 191 is provided which is slidably mounted in a guideway 192 carried by the casing 58 and is provided with a roller 193 for yieldable engagement with a recess 194 formed in the periphery of the cam 87.

The shaping machine is equipped with a pneumatically controlled stop device which is operated by the transfer mechanism in the event that an abnormal strain is encountered through the failure of a mold to open or the ware becoming lodged therein (Figs. 1, 22 and 23). This device comprises a rod 195 which is mounted for vertical sliding movement in bearings 196 and 197 carried by a bracket member 198. The bracket 198 is mounted on a fixed portion of the shaping machine and in a position that will permit the rod 195 to be projected into the path of movement of the arm 46 of the bell crank lever 32 (Fig. 1).

The bearing 196 constitutes a casing for a spring 199 which surrounds the rod 195 and bears against a collar 200 carried thereby (Fig. 23). An arm 201 having a hub portion 202 is fixed to the rod 195, intermediate of its bearings, and is provided with an adjusting screw 203 (Fig. 22). During the normal operation of the machine, the rod 195 is maintained in a retracted position against the action of the spring 199 and out of the path of movement of the arm 46 by a latch 204 which is pivoted to the bracket 198 and engages the upper edge of the hub 202. The latch 204 is maintained in this position by a depending latch member 205 which is pivotally suspended on the bracket 198 at 206 and is provided with a shoulder 207 for engagement with a shoulder 208 formed on the latch 204. The latch 205 is, in turn, maintained in operative position by a plunger 209 carried by a diaphragm 210. The diaphragm 210 is disposed within an air chamber 211 in the bracket 198 and is flexed outwardly by air pressure supplied from a pipe 212 through a connecting pipe 213. An exhaust pipe 214 also communicates with the chamber 211 and leads to a bleeder valve 215 mounted on the transfer mechanism (Figs. 1, 9 and 10).

The valve 215 is carried by a stem 216 and is normally maintained in a closed position by a spring 217. The valve stem 216 extends through the wall of the casing 58 and terminates at a point adjacent to the outer end of a rod 218 which is carried by the detent 116. In the event that an overload is encountered the detent 116 will be forced out of engagement with its notch 117 to disconnect the levers 110 and 113, as has been previously described (Fig. 9). This movement of the detent 116 will force the rod 218 carried thereby into engagement with the valve stem 216 and open the valve 215. The opening of the valve 215 will relieve the air pressure in the pipe 214 and the chamber 211 and will permit the diaphragm 210 to relax sufficiently to permit the latch 204, under the action of the spring 199, to force the latch 205 out of engagement therewith. The release of the latch 204 permits the rod 195 to be raised by the spring 199 into the path of the arm 46. The lever 32 will therefor be maintained in a position with the bolt 23 out of engagement with the table as long as the rod 195 is in the path of the arm 46. The stop device is reset by means of a lever 219 (Figs. 1, 22 and 23), which is pivoted to the bracket 198 at 220 and which bears against the collar 200 of the rod 195. One end of the lever 219 is engaged by a lever 221 which is fixed to a shaft 222 provided with an operating handle 223.

When the operation of the shaping machine is discontinued, it is necessary that the supply of glass thereto from the feeding mechanism shall be also discontinued. In order, therefore, to accomplish this end, the machine is preferably equipped with a pneumatic feeding device (Fig. 24) such as that disclosed in my Patent No. 1,466,367. This feeder comprises a forehearth 224 provided with an orifice 225 through which the molten glass emerges for severance into individual gobs or mold charges by a pair of shear blades 226. A laterally movable guide 227 is disposed beneath the orifice 225 and directs the mold charges after severance into a vertically movable trough 228 which delivers them to the molds of the shaping machine. The upper end of the trough 228 is carried by a bracket 229 which is provided with a deflecting guide 230 and a pair of forwardly extending arms 231. The arms 231 are secured to the opposite ends of a piston rod 232 which extends entirely through an air cylinder 233 and is provided with the usual piston 234. The cylinder 233 is fixed to a bracket 235 and may be supplied with air under pressure from a pipe 236 which communicates with the interior of a valve casing 237 provided on the bracket 198 of the safety stop device (Fig. 22). A pipe 238 establishes communication between the valve casing 237 and the pressure supply pipe 212 (Fig. 1). Communication between the pipes 236 and 238 is interrupted, during the normal operation of the machine, by a valve member 239 disposed within the chamber 236 and provided with a depending valve stem 240. When the rod 195 is elevated into the path of the arm 46 to discontinue the operation of the shaping machine, as previously explained, the screw 203 on the arm 201 (Fig. 22) will raise the lower end of the valve stem 240 and open the valve 239 thereby admitting air under pressure into the cylinder 233 of the feeding device and raising the trough 228 to the position shown in dotted lines in Fig. 24. In this position the trough is carried out of alignment with the guide 227 and the deflecting guide 230 is brought into a position in which it will deflect the mold charges delivered from the feeder into a cullet pit, not shown. As soon, however, as the rod 195 is lowered, in order to continue the operation of the shaping machine, the arm 201 is lowered permitting the valve 239 to close, thereby cutting off the supply of compressed air to the cylinder 233. The trough 228 may then return to its normal feeding position under the action of gravity, the air in the cylinder 223 escaping through a relatively small bleeding aperture 241, which is provided in the piston 234. A valve 242 may be provided in the pipe 236 by means of which the supply of air to the cylinder 233 may be cut off independently of the automatic cut-off heretofore described. When this valve is thus actuated, the air confined in the cylinder 233 may escape to the atmosphere.

The trough 228 may be raised and lowered independently of the compressed air cylinder 233 by means of a handle 243 which is pivotally mounted on the cylinder at 244 and which is provided with a cam lever 245 for engagement with a roller 246 carried by the bracket 229.

From the foregoing it will be apparent that a very efficient apparatus is provided in which the transfer mechanism not only opens the molds of a shaping machine and elevates the ware therefrom, but controls or participates in the control of the operation of the entire shaping machine, including the delivery of the mold charges thereto.

This take-out device is herein shown and described as being mounted in its own frame, separate from the shaping machine. This enables it to be manufactured and handled as a separate unit, and to be readily removed and replaced, or transferred to another shaping machine. Obviously, however, it may be incorporated in the shaping machine as a unitary part thereof.

The particular embodiment of the invention illustrated and described has been selected by way of example only, and it is to be understood that various modifications, arrangements, and combinations may be employed in fulfilling the spirit of the invention as defined in the claims.

What I claim is:—

1. The combination with a ware shaping machine, of ware transferring mechanism embodying pneumatic means for discontinuing the operation of said shaping machine.

2. The combination with a ware shaping machine, of means for delivering glass to said machine, and ware transferring mechanism adapted to interrupt the operation of said delivering means.

3. The combination with a ware shaping machine, of means for delivering glass to said machine, and ware transferring mechanism embodying pneumatic means for discontinuing the operation of said delivering means.

4. The combination with a ware shaping machine, of means for delivering glass to said machine, and ware transferring mechanism adapted to discontinue the operation of said shaping machine and the operation of said delivering means.

5. The combination with a ware shaping machine, of means for delivering glass to said machine, and ware transferring mechanism embodying pneumatic means for discontinuing the operation of said shaping machine and the operation of said delivering means.

6. The combination with a ware shaping machine embodying a mold element, of ware transferring mechanism provided with means for raising the ware in said mold, and means for discontinuing the operation of said shaping machine in the event that said raising means should fail to function.

7. The combination with a ware shaping machine embodying a mold element, of ware transferring mechanism provided with means for raising the ware in said molds and pneumatically controlled means for discontinuing the operation of said shaping machine in the event that said raising means should fail to function.

8. The combination with a ware shaping machine embodying a mold element, of means for delivering glass to said machine, a ware transferring mechanism provided with means for raising the ware in said mold, and means for discontinuing the operation of said delivering means in the event that said raising means should fail to function.

9. The combination with a ware shaping machine embodying a mold element, of means for delivering glass to said machine, a ware transferring mechanism provided with means for raising the ware in said mold, and pneumatically controlled means for discontinuing the operation of said delivering means in the event that said raising means should fail to function.

10. The combination with a ware shaping machine embodying a mold element, of means for delivering glass to said machine, a ware transferring mechanism provided with means for raising the ware in said mold, and means for discontinuing the operation of said machine and the operation of said delivering means in the event that said raising means should fail to function.

11. The combination with a ware shaping machine embodying a mold element, of means for delivering glass to said machine, a ware transferring mechanism provided with means for raising the ware in said mold and pneumatically controlled means for discontinuing the operation of said machine and the operation of said delivering means in the event that said raising means should fail to function.

12. In glass working apparatus, the combination of a shaping machine embodying a mold element, a ware transferring mechanism, means for raising the ware in said mold, fluid pressure means for rendering said shaping machine inoperative and a valve element operated by said transferring mechanism for rendering said pressure means operative in the event that said raising means should fail to function.

13. In a glass working apparatus, the combination of a shaping machine embodying a mold element, a device for feeding glass thereto, fluid pressure means for rendering said feeding device inoperative, a ware transferring mechanism, means for raising the ware in said mold, and a valve element operated by said transferring mechanism for rendering said pressure means operative in the event that said raising means should fail to function.

14. In a glass working apparatus, the combination of a shaping machine embodying a mold element, a device for feeding glass thereto, fluid pressure means for rendering said shaping machine and said feeding device inoperative, a ware transferring mechanism, means for raising the ware in said mold, and a valve element operated by said transferring mechanism for rendering said pressure means operative in the event that said raising means should fail to function.

15. In a glass working apparatus, the combination of a shaping machine embodying a mold element, a ware transferring mechanism operated by said shaping machine, means operated by said transferring mechanism for raising the ware in said mold, fluid pressure means for rendering said machine inoperative and a valve element operated by said transferring mechanism for rendering said pressure means operative.

16. In a glass working apparatus, the combination of a shaping machine embodying a mold element, a device for feeding glass thereto, fluid pressure means for rendering said feeding device inoperative, a ware transferring mechanism, means operated by said transferring mechanism for raising the ware in said mold, and a valve element operated by said transferring mechanism for rendering said pressure means operative in the event that said raising means should fail to function.

17. In a glass working apparatus, the combination of a shaping machine embodying a mold element, a device for feeding glass thereto, fluid pressure means for rendering said shaping machine and said feeding device inoperative, a ware transferring mechanism, means operated by said transferring mechanism for raising the ware in said mold, and a valve element operated by said transferring mechanism for rendering said pressure means operative in the event that said raising means would fail to function.

18. The combination with a glass shaping machine embodying a mold element, of a ware transferring mechanism provided with a ware engaging device, means for swinging said device about a fixed axis toward said mold, and means for simultaneously projecting said device in a radial direction relative to its axis of swing to an operative position adjacent to said mold, whereby said device traverses a path that is the resultant of said swinging and radial movement.

19. The combination with a glass shaping machine embodying a mold element, of a ware transferring mechanism provided with a ware engaging device, means for swinging said device toward said mold and means for simultaneously projecting it in a rectilinear path away from its axis of swing to an operative position adjacent to said mold.

20. The combination with a glass shaping machine embodying a mold element, of a ware transferring mechanism provided with a ware engaging device, means for swinging said device toward and away from said mold to remove the ware therefrom, and means for simultaneously increasing and decreasing the radius of swinging movement.

21. The combination with a glass shaping machine embodying a mold element, of a ware transferring mechanism having a ware engaging device mounted for oscillatory movement to and from said mold, and means for increasing and decreasing its radius of swinging movement.

22. The combination with a glass shaping machine embodying a mold element, of a ware transferring mechanism provided with a ware engaging device, means for swinging said device toward and away from said mold and means for simultaneously increasing and decreasing its radius of swinging movement whereby the ware will traverse a path that is the resultant of said movements when removed from said mold by said take-out device.

23. The combination with a glass shaping machine embodying a mold element, of a ware transferring mechanism having a ware engaging device adapted to be oscillated to and from a position in axial alignment with a prolongation of the axis of said mold and reciprocated relative to its axis of oscillation to and from a position above said mold.

24. The combination with a glass shaping machine embodying a mold element, of a ware transferring mechanism provided with a ware engaging device means for swinging said device toward and away from said mold, and means for projecting and retracting said device radially, with respect to the axis of swinging movement, to and from a position above said mold.

25. The combination with a glass shaping machine embodying a mold element, of a ware transferring mechanism provided with means for elevating the ware in said mold, a take-out device for removing the ware from the mold, means for swinging said take-out device toward and away from said mold, and simultaneously increasing and decreasing the radius of swinging movement, and pneumatic means for discontinuing the operation of said take-out device in the event that said elevating means should fail to function.

26. The combination with a glass shaping machine embodying a mold element, of a ware transferring mechanism provided with means for elevating the ware in said mold, a take-out device for removing the ware from the mold, means for swinging said take-out device toward and away from said mold, and simultaneously increasing and decreasing the radius of swinging movement, and pneumatic means for discontinuing the operation of said take-out device in a predetermined position in the event that said elevating means should fail to function.

27. The combination with a glass shaping machine embodying a mold element, of a ware transferring mechanism provided with means for elevating the ware in said mold, a take-out device for removing the ware from the mold, means for swinging said take-out device toward and away from said mold, and simultaneously increasing and decreasing the radius of swinging movement, and pneumatic means for discontinuing the operation of said take-out device in a safety position remote from said shaping machine and without the path of travel of said mold in the event that said elevating means should fail to function.

28. The combination with a glass shaping machine embodying a mold element, of a ware transferring mechanism provided with means for elevating the ware in said mold, a take-out device for removing the ware from the mold, means for swinging said take-out device toward and away from said mold, and simultaneously projecting it in a rectilinear path to an operative position adjacent said mold, and pneumatic means for discontinuing the operation of said take-out device in a position remote from said shaping machine and without the path of travel of said mold in the event that said elevating means should fail to function.

29. The combination with a glass shaping machine including a mold, and means for opening said mold, a ware take-out mechanism comprising means for actuating said mold opening means, means for removing the ware laterally from said mold, and means for removing the ware laterally from said ware removing means at a delivery station.

30. The combination with a glass shaping machine including a mold, and means for opening said mold, a ware take-out mechanism comprising means for actuating said mold opening means, coacting jaws for removing the ware laterally from said mold, and a conveyor for removing the ware laterally from said ware removing means at a delivery station.

31. The combination with a glass shaping machine embodying a mold element, of a ware transferring mechanism provided with a take-out device, means for oscillating said device between a receiving station adjacent to said mold and a delivery station remote therefrom, and a pair of vertically movable plungers, one located at each of said stations for actuating said device to receive and deposit said ware.

32. The combination with a glass shaping machine embodying a mold element, of a ware transferring mechanism provided with a pair of take-out tongs, means for moving said tongs to and from a receiving station above said mold, and a delivery station remote therefrom, means for maintaining said tongs closed during such movement, opening means carried by said tongs, and means located in the path of movement of said opening means at each of said stations adapted to move said opening means with respect to the tongs to actuate the tongs to receive and discharge the ware.

33. The combination with a shaping machine embodying a mold, of a ware transferring mechanism provided with an arm, a carriage carried by said arm, a take-out device carried by said carriage, means for simultaneously moving said arm about a fixed axis toward and away from said mold, and means for oscillating said carriage radially on said arm.

34. The combination with a shaping machine embodying a mold element, of a ware transferring mechanism provided with an arm, a carriage mounted on said arm, a ware engaging device mounted on said carriage, means for swinging said arm to and from said mold element, and means for reciprocating said carriage upon said arm.

35. The combination with a shaping machine embodying a mold element, of a ware transferring mechanism provided with an arm, a carriage slidably mounted on said arm, a ware engaging device mounted on said carriage, means for oscillating said arm between said mold and a delivery station, means for reciprocating said carriage on said arm, and means for actuating said take-out device.

36. The combination with a shaping machine embodying a mold element, of a ware transferring mechanism provided with means for opening said mold and a ware engaging device, means for oscillating said device about a stationary axis, and means for projecting it radially with respect to said axis toward and away from said mold to remove the ware from between the sections thereof in a substantially radial direction with respect to the axis of the mold.

37. The combination with a glass shaping machine embodying a mold, of a transferring mechanism comprising a support, a pair of take-out tongs pivotally mounted on said support, means for moving said tongs to and from a receiving station above said mold and a delivery station remote therefrom, yieldable means carried by said support for maintaining said tongs closed during such movement, a lever carried by said support for opening said tongs, and means located in the path of movement of said lever adjacent to said receiving and delivery stations for actuating said lever to open said tongs to receive and discharge the ware.

38. The combination with a glass shaping machine embodying a mold, of a transferring mechanism comprising a support, a pair of take-out tongs pivotally mounted on said support, means for moving said tongs to and from a receiving station above said mold and a delivery station remote therefrom, a spring carried by said support for maintaining said tongs closed during such movement, a lever carried by said support for opening said tongs, and a vertically movable rod located in the path of movement of said lever adjacent to both said receiving station and said delivery station for actuating said lever to open said tongs against the action of said spring to receive and discharge the ware.

39. The combination with a ware shaping machine, of ware transferring mechanism embodying means for discontinuing the operation of said shaping machine.

Signed at Hartford, Connecticut, this 28th day of April, 1924.

EDWARD H. LORENZ.

CERTIFICATE OF CORRECTION.

Patent No. 1,642,421. Granted September 13, 1927, to

EDWARD H. LORENZ.

It is hereby certified that error appears in the printed specification of the above numbered patent requiring correction as follows: Page 1, line 10 for the word "wire" read "ware"; page 9, line 122, claim 17, for the word "would" read "should"; page 11, line 28, claim 33, strike out the words "simultaneously moving" and insert the word "oscillating"; same page and claim, line 30, strike out the word "oscillating" and insert the words "simultaneously moving"; and that the said Letters Patent should be read with these corrections therein that the same may conform to the record of the case in the Patent Office.

Signed and sealed this 11th day of October, A. D. 1927.

Seal

M. J. Moore,
Acting Commissioner of Patents.